No. 863,557. PATENTED AUG. 13, 1907.
O. O. RISWOLD.
LAWN MOWER.
APPLICATION FILED SEPT. 8, 1906.
3 SHEETS—SHEET 1.
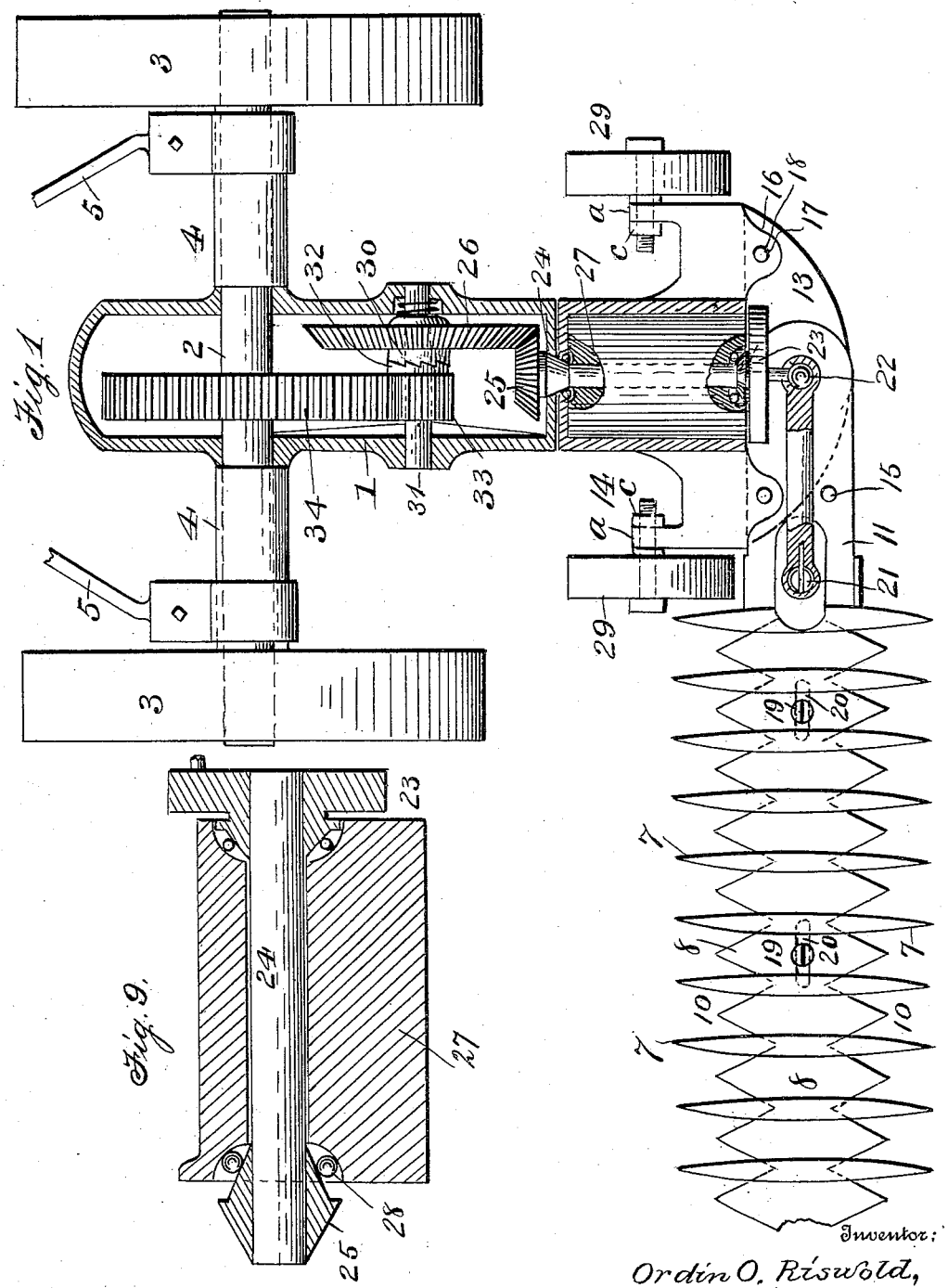
Inventor:
Ordin O. Riswold,

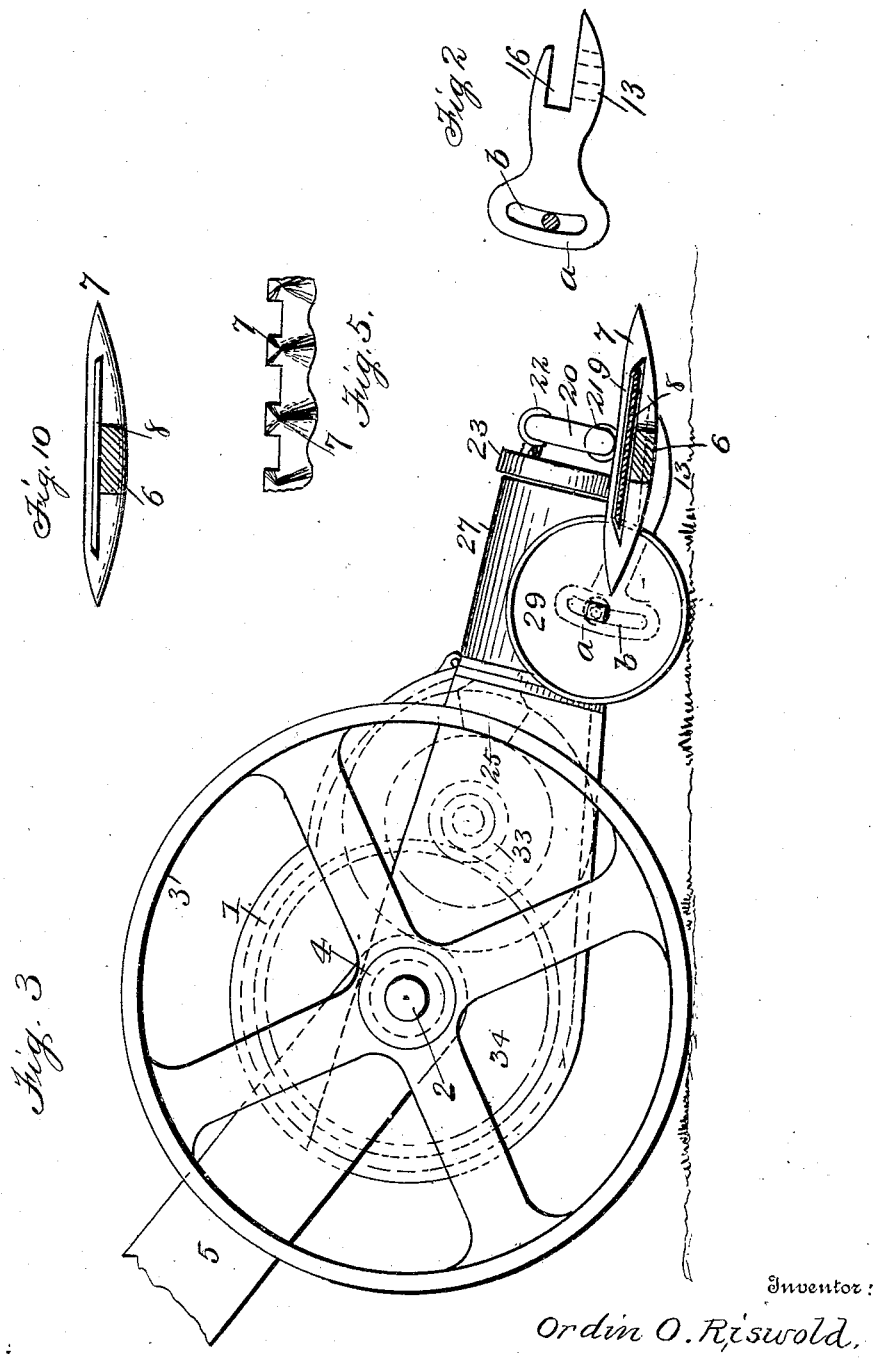

No. 863,557.
PATENTED AUG. 13, 1907.
O. O. RISWOLD.
LAWN MOWER.
APPLICATION FILED SEPT. 8, 1906.
3 SHEETS—SHEET 3.
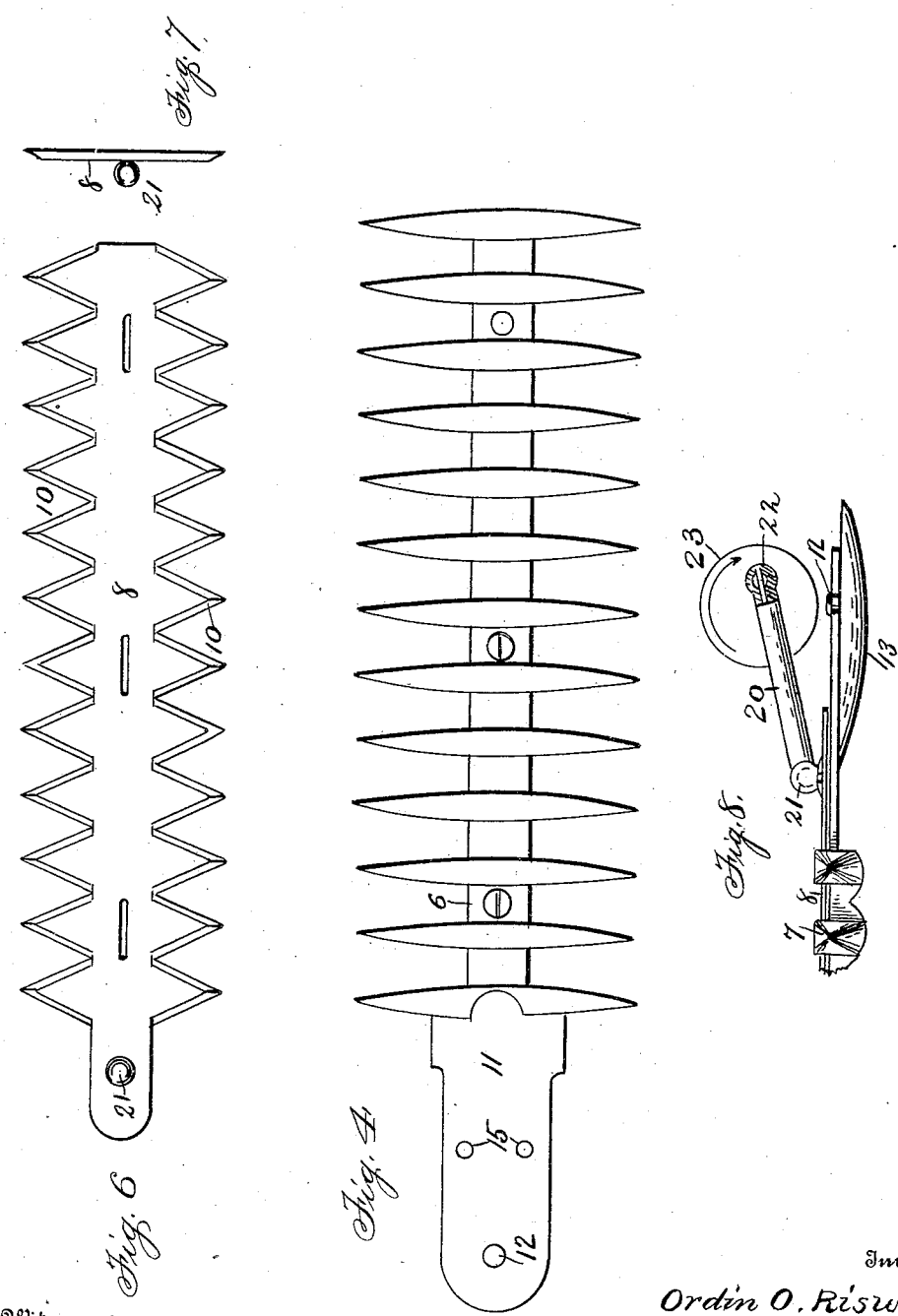
Witnesses:
Inventor
Ordin O. Riswold
By
Attorneys

UNITED STATES PATENT OFFICE.

ORDIN O. RISWOLD, OF JOLIET, ILLINOIS.

LAWN-MOWER.

No. 863,557.  Specification of Letters Patent.  Patented Aug. 13, 1907.

Application filed September 8, 1906. Serial No. 333,835.

*To all whom it may concern:*

Be it known that I, ORDIN O. RISWOLD, a citizen of the United States, residing at Joliet, in the county of Will and State of Illinois, have invented certain new and useful Improvements in Lawn-Mowers, of which the following is a specification.

My invention relates to improvements in lawn mowers.

Its object is principally to render the sickle or cutter bar effective for cutting to the right or left of the path of the machine which is, of course, greatly desirable in places which would not otherwise be accessible to such cutting action as will be later disclosed; and to effect this end in a simple, economic and effective manner.
Said invention consists of certain structural features or instrumentalities substantially as hereinafter fully disclosed and specifically pointed out by the claims.

In the accompanying drawing illustrating the preferred embodiment of my invention—Figure 1 is a partly plan view and horizontal section thereof. Fig. 2 is a side view of the shoe at the forward end of the machine. Fig. 3 is a sectional elevation of the machine. Fig. 4 is a plan view of the finger-bar. Fig. 5 is a forward edge of a number of the finger-bar guards. Fig. 6 is a detached plan view of the cutter or sickle bar. Fig. 7 is an end view of Fig. 6. Fig. 8 is a broken front elevation of the machine. Fig. 9 is a vertical longitudinal section produced through the housing or casing bearing the driving shaft of the sickle-bar's actuating eccentric or crank. Fig. 10 is a transverse section taken through the finger-bar.

In carrying out my invention, I suitably mount transversely in a housing or casing 1, an axle or shaft 2 to which are keyed wheels 3, between which and said housing said shaft or axle is provided with sleeves 4 passing around and to which are fixed the eye-ended portions of castings 5 to which are fixed the pushing handle of the machine.

A finger bar 6, equipped at suitable intervals along its length, with guard-fingers 7, has arranged thereon, a sickle or cutter bar 8 working through properly formed slots 9 in the fingers or guards 7, which sickle or cutter bar is equipped with two series of cutting blades 10 preferably of ordinary saw-tooth form, arranged back to back, to render the same effective for cutting action either at the right or left of the travel of the machine, as presently more fully disclosed. Said finger bar 6, which has one end preferably widened or enlarged as at 11, has said end pivotally connected, as at 12, to the upper surface of a shoe 13 secured to the forward end of the machine-frame 14, said shoe being adapted to form a suitable bearing therefor and to facilitate the movement of the machine at that point as well understood. Said end of finger bar 6 is provided also with two opposite apertures 15 and is supported upon the upper flat surface of the shoe 13 and fits laterally into one of two undercut recesses or slots 16 provided in the upper portion of said shoe; and through the requisite one of said apertures 15 and the registering one of two other apertures 17 formed in the overhanging portions of the slots or recesses 16, is inserted a retaining pin or bolt 18 for the proper retention of said finger bar with the cutter bar in effective position. Said slots or recesses 16, whose upper or overhanging walls are provided with the apertures 17, are arranged upon opposite sides of the pivot-point of the finger bar 6. The sickle-bar 8 is provided with set or guide screws 19 passing through slots 20 therein and entering or engaging the finger bar 6, for the retention of the sickle-bar in position close to the guards or fingers, the slots permitting the requisite reciprocating movement of the sickle bar.

The sickle or cutter bar 8 is actuated by means of a pitman 20 having suitable pivotal or ball and socket connection therewith, as at 21, and as at 22 with an eccentric or crank 23 secured to a shaft 24 suitably geared by a beveled pinion 25 with a corresponding bevel-wheel 26 ultimately receiving motion from the driving or transportating wheels and their axle as presently noted. The shaft 24 which is suitably supported in a bearing housed within a casing or inclosure 27 is supported upon ball bearings 28 therein as shown, said casing being itself suitably supported in position at the forward end of the casing or housing 1, before described, and upon the frame 14 borne by the forward truck-wheels 29, whose axles are suitably mounted in the latter, preferably as shown, or they may be otherwise connected thereto. The bevel-wheel 26 is carried by a clutch-member 30 upon a shaft or axle 31 fixed in the housing or casing 1 said clutch-member having engagement with an opposed clutch-member 32 of a pinion 33 sleeved upon the axle or shaft 31 and meshing with, and driven by a much larger pinion or gear-wheel 34 fixed upon, and receiving its motion from the driving shaft or axle 2 before noted, thus providing for transmitting the motion of the latter to the aforesaid gearing for operating the eccentric and pitman directly actuating the sickle or cutter bar. The carrying frame 14 has, upon opposite sides of the casing or inclosure of the ball-bearing engaged shaft 24, quadrants $a$ provided with arcuate slots $b$ receiving the shafts of the wheels 29, which shafts are suitably screw-threaded and equipped with nuts $c$ for their required adjustment in said slots in varying the declination of the forward end of the machine as circumstances may suggest.

It is noted that when it may be desired to shift the finger bar 6, together with the sickle bar to the opposite side of the line of travel of the machine, as in effecting the cutting action at the left it is only necessary to withdraw the bolt or pin 18 and move said finger bar with the attached sickle bar to the opposite side or left-hand when the former is similarly pinned or bolted in position, the pivotal connections between the pitman and the sickle-bar and eccentric or crank permitting of such movement of the latter without disconnecting or detaching it.

It will be seen that by means of my machine and the aforesaid adjustment of parts, it may be adapted to cut all kinds of grass whether high or low, whether in corners, along walls, side-walks and fences, or upon the level ground by the same machine.

I claim—

1. A lawn-mower, employing a cutter-bar provided on each side with cutting-teeth, a finger bar therefor, means for shifting said cutter-bar and said finger-bar from side to side of the line of travel; said finger-bar having one end provided with three apertures, and a frame or shoe member having duplicate undercut recesses or slots adapted to receive one edge of said end of said finger bar and a pivot-bolt insertible through one of the aforesaid apertures, and a pin or bolt for insertion through either of the others of said apertures and through the registering aperture in the upper or overhanging wall of the recess or slot receiving at the time said finger bar end-portion.

2. A lawn-mower, employing a cutter-bar provided on each side with cutting-teeth, mechanism for its actuation including a crank and a pitman having ball-and-socket joint connections with the latter and said cutter-bar, a finger bar having a pivotal connection with the machine-frame, said frame having duplicate undercut recesses or slots either of which receives one edge of said finger bar, means effective for the retention of said finger-bar within one or the other of said recesses or slots, and a set-screw insertible through a slot in said cutter-bar and entering said finger bar for the retention of said cutter-bar well in contact with the fingers or guards of said finger bar.

In testimony whereof I have signed my name to this specification in the presence of two subscribing witnesses.

ORDIN O. RISWOLD.

Witnesses:
 JOHN RISWOLD,
 WRAAL NOSS.